United States Patent
Katou

(10) Patent No.: US 11,542,385 B2
(45) Date of Patent: Jan. 3, 2023

(54) LENS FOR SPECTACLES AND SPECTACLES

(71) Applicant: FUJIFILM Corporation, Tokyo (JP)

(72) Inventor: Takashi Katou, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/064,585

(22) Filed: Oct. 6, 2020

(65) Prior Publication Data

US 2021/0017358 A1 Jan. 21, 2021

Related U.S. Application Data

(63) Continuation of application No. PCT/JP2019/014548, filed on Apr. 1, 2019.

(30) Foreign Application Priority Data

Apr. 11, 2018 (JP) .............................. JP2018-076258

(51) Int. Cl.

| | | |
|---|---|---|
| *C08K 5/3445* | (2006.01) | |
| *C08K 5/07* | (2006.01) | |
| *C08K 5/315* | (2006.01) | |
| *C08K 5/3462* | (2006.01) | |
| *G02B 1/04* | (2006.01) | |
| *G02C 7/10* | (2006.01) | |
| *C08L 63/00* | (2006.01) | |
| *C08L 69/00* | (2006.01) | |
| *C08L 75/04* | (2006.01) | |

(52) U.S. Cl.
CPC .............. *C08K 5/3445* (2013.01); *C08K 5/07* (2013.01); *C08K 5/315* (2013.01); *C08K 5/3462* (2013.01); *C08L 63/00* (2013.01); *C08L 69/00* (2013.01); *G02B 1/041* (2013.01); *G02C 7/10* (2013.01); *G02C 7/108* (2013.01); *C08L 75/04* (2013.01); *C08L 2201/10* (2013.01)

(58) Field of Classification Search
None
See application file for complete search history.

(56) References Cited

U.S. PATENT DOCUMENTS

| | | | |
|---|---|---|---|
| 3,047,650 | A1 | 11/2011 | Mainster et al. |
| 8,292,428 | B2 | 10/2012 | Mainster et al. |
| 2005/0243272 | A1 | 11/2005 | Mainster et al. |
| 2008/0013045 | A1 | 1/2008 | Mainster et al. |
| 2018/0341119 | A1* | 11/2018 | Kurtz ..................... G02B 30/25 |

FOREIGN PATENT DOCUMENTS

| | | |
|---|---|---|
| JP | 2000258618 | 9/2000 |
| JP | 2001013318 | 1/2001 |
| JP | 2007535708 | 12/2007 |
| JP | 2010084006 | 4/2010 |
| JP | 2011237730 | 11/2011 |
| JP | 2013159764 | 8/2013 |
| JP | 2013228520 | 11/2013 |
| JP | 5961437 | 8/2016 |
| JP | 2018036516 | 3/2018 |
| JP | 2019095492 | 6/2019 |

OTHER PUBLICATIONS

"Office Action of Japan Counterpart Application" with English translation thereof, dated Aug. 10, 2021, p. 1-p. 6.
Alexander S Tatikolov et al., "Complexation of polymethine dyes with human serum albumin: a spectroscopic study", Biophysical Chemistry, Jan. 2004, pp. 33-49.
Office Action of Japan Counterpart Application, with English translation thereof, dated Feb. 8, 2022, pp. 1-8.
"Office Action of China Counterpart Application" with partial English translation thereof, dated Sep. 28, 2021, p. 1-p. 8.
Gianluca Tosini et al., "Effects of blue light on the circadian system and eye physiology", Molecular Vision, Jan. 24, 2016, pp. 61-72.
"International Search Report (Form PCT/ISA/210) of PCT/JP2019/014548," dated Jun. 25, 2019, with English translation thereof, pp. 1-4.
"Written Opinion of the International Searching Authority (Form PCT/ISA/237) of PCT/JP2019/014548," dated Jun. 25, 2019, with English translation thereof, pp. 1-9.

* cited by examiner

*Primary Examiner* — Robert T Butcher
(74) *Attorney, Agent, or Firm* — JCIPRNET

(57) ABSTRACT

Provided are a lens for spectacles containing a resin and a coloring agent having a maximum absorption wavelength in a methanol solution in a range of 400 nm to 500 nm and a half-width of an absorption peak in a methanol solution of 10 nm or more and less than 40 nm, and spectacles.

9 Claims, No Drawings

LENS FOR SPECTACLES AND SPECTACLES

CROSS-REFERENCE TO RELATED APPLICATIONS

This application is a continuation application of International Application No. PCT/JP2019/014548, filed Apr. 1, 2019, the disclosure of which is incorporated herein by reference in its entirety. Further, this application claims priority from Japanese Patent Application No. 2018-076258, filed Apr. 11, 2018, the disclosure of which is incorporated herein by reference in its entirety.

BACKGROUND OF THE INVENTION

1. Field of the Invention

The present disclosure relates to a lens for spectacles and spectacles.

2. Description of the Related Art

In the case of using an image display device such as a cathode ray tube display device, a plasma display, an electroluminescent display, a fluorescent display, a field emission display, or a liquid crystal display (LCD), or any of various displays such as a smart phone with a touch panel or a tablet terminal, or the like, the screen of the display comprising a light source is visually observed. Blue light emitted from the display of these devices is known to be a factor causing eye strain.

In the related art, the problems of blue light in a wavelength range of 450 nm to 460 nm have been pointed out, but it has been pointed out in 'Molecular Vision' Vol. 22 pp. 61-72 (2016) that there are also the problems of blue light in a wavelength range of 480 nm to 500 nm. Thus, it is desired to block the blue light on the longer wavelength side from the viewpoint of suppressing eye fatigue due to optical stimulation, the occurrence of sleep disorder, and the like. For example, it is known that the light of a fluorescent lamp has a steep emission peak with a half-width of 25 nm over a wavelength of 480 nm to 500 nm. Further, it is known that a white light emitting diode (LED) has an emission peak in a wavelength range of 460 nm to 500 nm.

Therefore, in recent years, attempts have been made to reduce the influence of blue light on the eye by allowing a lens for spectacles to absorb blue light, particularly blue light having a wavelength in the range of 400 nm to 500 nm, that is, to absorb blue light having a longer wavelength than lens for spectacles in the related art.

For example, as a lens for spectacles capable of absorbing blue light, a lens for spectacles comprising a dyeing layer containing a colorant such as an oxonol dye on a plastic base material has been proposed (see JP5961437B).

Further, as a lens for spectacles capable of absorbing blue light, a lens for spectacles including a benzotriazole-based ultraviolet absorbing agent has been proposed (see JP2010-084006A).

SUMMARY OF THE INVENTION

However, although the oxonol dye disclosed in JP5961437B has a blue light-cutting property, but the oxonol dye also has a broad absorption waveform with a half-width of 50 nm or more, for example, and thus may cause strong yellow coloration and a change in tint in a case where an object is viewed through the lens.

The lens for spectacles containing a benzotriazole-based ultraviolet absorbing agent disclosed in JP2010-084006A has a problem in that blue light having a wavelength near 400 nm cannot sufficiently be blocked.

An object of an embodiment of the present invention is to provide a lens for spectacles capable of blocking blue light in a wavelength range of at least 400 nm to 500 nm, in which a change in tint is hardly recognized in a case where an object is viewed through the lens.

An object of another embodiment according to an aspect of the present invention is to provide spectacles comprising the lens for spectacles.

Means for solving the above problems include the following aspects:

<1> A lens for spectacles comprising: a resin; and a coloring agent having a maximum absorption wavelength in a methanol solution in a range of 400 nm to 500 nm and a half-width of an absorption peak in a methanol solution of 10 nm or more and less than 40 nm.

<2> The lens for spectacles according to <1>, in which the maximum absorption wavelength of the coloring agent is in a range of 480 nm to 500 nm.

<3> The lens for spectacles according to <1> or <2>, in which the coloring agent is a methine coloring agent.

<4> The lens for spectacles according to any one of <1> to <3>, in which the coloring agent is an oxonol coloring agent.

<5> The lens for spectacles according to <4>, in which the oxonol coloring agent is represented by General Formula (1).

$$A^1 = L^1 - L^2 = L^3 - A^2 \ nM^+ \quad (1)$$

In General Formula (1), $A^1$ represents a keto foil ii of an acidic nucleus selected from the group consisting of General Formulae (1-a) to (1-x); $A^2$ represents an enol form of an acidic nucleus selected from the group consisting of General Formulae (1-a) to (1-x), in which a hydroxyl group in the enol form may be dissociated;

$L^1$, $L^2$, and $L^3$ each independently represent a methine group which may be substituted; and $M^+$ represents a hydrogen atom or a monovalent counter cation, and n represents the number required to make a positive charge number of M equal to a negative charge number of $A^1 = L^1 - L^2 = L^3 - A^2$.

(1-a)

(1-b)

(1-c)

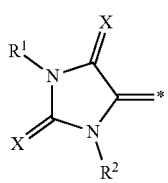
(1-d)
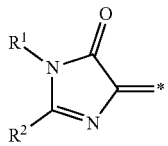
(1-e)
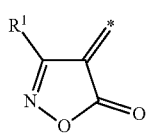
(1-f)
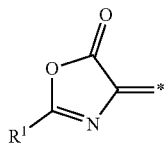
(1-g)
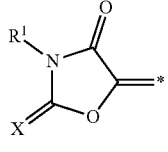
(1-h)
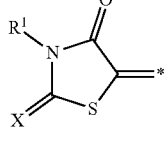
(1-i)
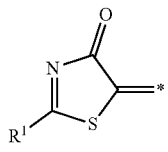
(1-j)
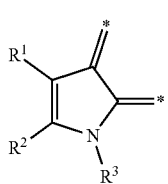
(1-k)
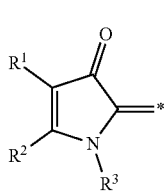
(1-l)
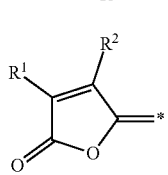
(1-m)
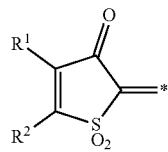
(1-n)
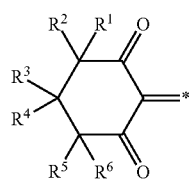
(1-o)
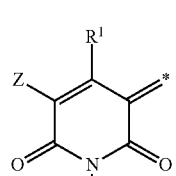
(1-p)
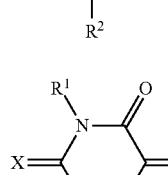
(1-q)
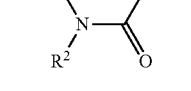
(1-r)
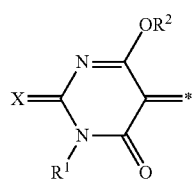
(1-s)
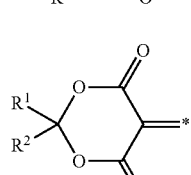
(1-t)
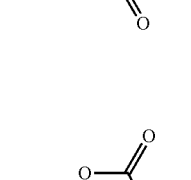
(1-u)
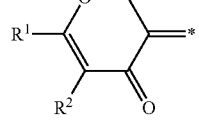
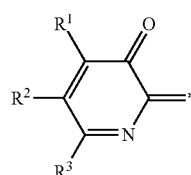
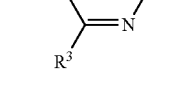

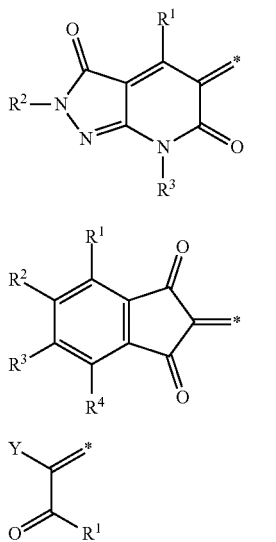

In General Formulae (1-a) to (1-x), each * represents a position at which the keto form $A^1$ of the acidic nucleus is bonded to $L^1$ and the enol form $A^2$ of the acidic nucleus is bonded to $L^3$; and X represents an oxygen atom or a sulfur atom; Y represents an electron-withdrawing group; Z represents a hydrogen atom, a carbamoyl group, an alkyl group, an aryl group, a cyano group, a carboxyl group, an acyl group, an alkyloxycarbonyl group, an aryloxycarbonyl group, a halogen atom, an amino group, an acylamino group, an alkylsulfonyl group, an arylsulfonyl group, or a sulfo group; and $R^1$, $R^2$, $R^3$, $R^4$, $R^5$, and $R^6$ each independently represent a hydrogen atom or a monovalent substituent.

<6> The lens for spectacles according to <5>, in which in General Formula (1), $A^1$ represents a keto form of an acidic nucleus selected from the group consisting of (1-b), (1-c), and (1-q), and $A^2$ represents an enol form of an acidic nucleus selected from the group consisting of (1-b), (1-c), and (1-q).

<7> The lens for spectacles according to <3>, in which the methine coloring agent is represented by General Formula (2).

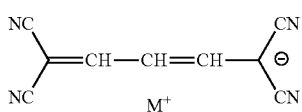

In General Formula (2), $M^+$ represents a hydrogen atom or a monovalent counter cation.

<8> The lens for spectacles according to any one of <1> to <7>, in which the coloring agent is kneaded into the resin.

<9> The lens for spectacles according to any one of <1> to <8>, further comprising an ultraviolet absorbing agent selected from the group consisting of a benzotriazole compound and a triazine compound.

<10> Spectacles comprising the lens for spectacles according to any one of <1> to <9>.

According to an embodiment of the present invention, there is provided a lens for spectacles capable of blocking blue light in a wavelength range of at least 400 nm to 500 nm, in which a change in tint is hardly recognized in a case where an object is viewed through the lens.

According to another embodiment according to an aspect of the present invention, there are provided spectacles comprising the lens for spectacles.

DESCRIPTION OF THE PREFERRED EMBODIMENTS

Hereinafter, a lens for spectacles and spectacles of the present disclosure will be described. However, the present disclosure is not limited to the following embodiments in any way, and modifications can be made as appropriate within the scope of the gist thereof.

In the present disclosure, a numerical range indicated by using "to" means a range including numerical values described before and after "to" as the minimum value and the maximum value, respectively.

In the numerical ranges described in a stepwise manner in the present disclosure, an upper limit value or a lower limit value described in a certain numerical range may be replaced with an upper limit value or a lower limit value in another numerical range described in a stepwise manner. Further, in the numerical ranges described in the present disclosure, the upper limit value or the lower limit value in a certain numerical range may be replaced with values described in Examples.

Further, in the present disclosure, a combination of two or more preferred aspects is a more preferable aspect.

In the present disclosure, in a case where a plurality of substances corresponding to each component are present, a concentration or a content of each component means a total concentration or a total content of the plurality of substances, unless otherwise specified.

In the present disclosure, the "blocking of blue light" encompasses not only the case where the blue light is completely blocked but also the case where at least a part of the blue light through a lens for spectacles is blocked to reduce the transmittance of the blue light.

[Lens for Spectacles]

The lens for spectacles of the present disclosure contains a coloring agent (hereinafter, sometimes simply referred to as a "specific compound") having a maximum absorption wavelength in a methanol solution (hereinafter, sometimes simply referred to as "maximum absorption wavelength") in a range of 400 nm to 500 nm, and a half-width of an absorption peak in a methanol solution (hereinafter, sometimes referred to as "half-width") of 10 nm or more and less than 40 nm.

The lens for spectacles according to the present disclosure is capable of blocking blue light in a wavelength range of at least 400 nm to 500 nm, in which a change in tint is hardly recognized in a case where an object is viewed through the lens.

The maximum absorption wavelength and the half-width of each compound in the present disclosure are values calculated from absorption spectra obtained by measurement in methanol. The absorption spectrum is measured at room temperature (25° C.) using a spectrophotometer (Model number: UV 3150) manufactured by Shimadzu Corporation as a measuring instrument.

The mechanism of action of the lens for spectacles of the present disclosure is not clear, but the present inventors assume as follows.

Blue light in the wavelength range of 400 nm to 500 nm can be blocked to some extent by an ultraviolet absorbing agent having a maximum absorption in the wavelength range of 380 nm to 400 nm. However, a general ultraviolet absorbing agent has a broad absorption waveform, a half-width of an absorption peak of 50 nm or more, generally 100 nm or more, and also has absorption in a wavelength range other than the absorption peak. Accordingly, in a case where an object is viewed through the lens for spectacles, undesirable absorption occurs, so that a yellow tint is recognized in particular. Therefore, there in a tendency in that in a case where a plastic lens containing a general ultraviolet absorbing agent is used as the lens for spectacles, a yellowish image is viewed, and thus in a case where an object is viewed through the lens for spectacles, a change in tint is easily recognized.

On the other hand, the specific compound contained in the lens for spectacles of the present disclosure has a maximum absorption in a wavelength range of 400 nm to 500 nm in a methanol solution, and has an extremely narrow half-width of 10 nm or more and less than 40 nm, forming a sharp peak at the maximum absorption wavelength in the absorption spectrum. In other words, due to the half-width of 10 nm or more and less than 40 nm, the absorptivity of light having a wavelength shorter or longer than the maximum absorption wavelength is remarkably low. As such, it is considered that since the specific compound has satisfactory blue light-blocking property required, has a sharp peak at the maximum absorption wavelength in the absorption spectrum, and has extremely low absorptivity in the wavelength range other than the maximum absorption wavelength compared with the absorption of the maximum absorption wavelength, the lens for spectacles hardly has a yellowish tint in a case where the specific compound is applied to a lens for spectacles and thus a change in tint is hardly recognized in a case where an object is viewed through the lens for spectacles.

In general, the half-width of absorption in a compound such as an ultraviolet absorbing agent is caused by the vibration of the molecule of the compound, and the half-width tends to increase as a plurality of vibration modes exist in the molecule of the compound. Further, in a case where the molecular structure is easily twisted thermally, a plurality of vibration modes exist in the molecule of the compound, and due to the existence of the plurality of vibration modes, the half-width increases. On the other hand, it is considered that in a case where the molecular structure of the compound is hardly twisted thermally, the molecule of the compound has a single vibration mode and thus the half-width decreases.

Generally, in the case of a compound having a structure in which molecules are polarized, a plurality of vibration modes exist and thus the half-width increases. Examples of the compound having a structure in which molecules are polarized include a donor-acceptor type coloring agent, and specific examples thereof include a donor-acceptor type azo coloring agent and a merocyanine coloring agent. On the other hand, in the case of a compound having a structure in which the molecules are highly symmetrical and the charge of the molecule is delocalized, the molecules have a single vibration mode and thus the half-width decreases. The compound having a structure in which the charge of the molecules is delocalized corresponds to, for example, a methine-based coloring agent, and specific examples thereof include an oxonol coloring agent and a cyanine coloring agent.

Factors such as the difference in hydrophilicity/hydrophobicity between the coloring agent and the resin and the magnitude of the intermolecular interaction between the coloring agent and the resin are estimated in relation to the cause of the phase separation between the resin and the coloring agent contained in the lens for spectacles. Furthermore, as another cause of the phase separation between the resin and the coloring agent contained in the lens for spectacles, the difference between the compounds in the degree of the twist of the molecule described above is considered as one of the factors. In other words, a compound having a large half-width is easily twisted in the molecular structure in the case of being excited. Specifically, a compound having a large half-width easily undergoes molecular twist in a case where the compound is excited by energy application such as ultraviolet irradiation. Therefore, there is a concern that the coloring agent and the resin easily undergo phase separation caused by the twist of the coloring agent dispersed in the resin. On the contrary, the specific compound having a small half-width at the absorption peak is expected to be hardly twisted in the molecular structure and hardly cause phase separation.

The specific compound of the present disclosure is considered to have, while having the desired blue light-cutting property, a secondary effect of suppressing the phase separation between the resin and the specific compound due to the twisting of the compound molecule in the case of coexisting with the resin, and suppressing a decrease in transparency, i.e., an increase in haze of the lens for spectacles caused by the phase separation. Accordingly, the use of the specific compound as an ultraviolet absorbing agent is also considered to be advantageous in that the transparency, which is one of the characteristics of the lens for spectacles, is maintained for a long period of time as it suppresses a decrease in transparency of the lens for spectacles, and the light resistance of the lens for spectacles is thus further improved.

On the other hand, in a case where the half-width of the absorption spectrum of the compound is less than 10 nm, which is smaller than the provision of the present disclosure, the blue light-blocking property in the wavelength range of 400 nm to 500 nm may be decreased.

In contrast to the lens for spectacles of the present disclosure, the oxonol coloring agent disclosed in JP5961437B has a half-width of 40 nm to 140 nm may block blue light to some extent, but there is a concern that the lens for spectacles becomes yellowish. Further, the lens for spectacles disclosed in JP2010-084006A contains a benzotriazole-based ultraviolet absorbing agent as a main compound for blocking blue light. Since the benzotriazole-based ultraviolet absorbing agent has a wide absorption from 400 nm to 450 nm and has insufficient blue light-blocking property at a wavelength near 400 nm and can absorb light having a wavelength of around 450 nm, the lens for spectacles tends to have a yellowish tint.

However, the above assumption is not intended to limit the effect of the lens for spectacles of the present disclosure, but is intended to describe the effect as an example.

The maximum absorption wavelength of the specific compound is in the range of 400 nm to 500 nm, preferably in the range of 440 nm to 500 nm, and more preferably in the range of 480 nm to 500 nm.

The half-width of the specific compound is in the range of 10 nm or more and less than 40 nm, preferably in the range of 15 nm or more and less than 40 nm, and more preferably in the range of 20 nm to 35 nm.

In a case where the maximum absorption wavelength of the specific compound and the half-width fall within the above ranges, the blue light-blocking property in the target wavelength range is satisfactory, and it becomes more difficult to recognize a change in tint in a case where an object is viewed through the lens for spectacles.

Absorption characteristics having a maximum absorption wavelength in the range of 400 nm to 500 nm and a half-width of 10 nm or more and less than 40 nm may be hereinafter referred to as specific absorption characteristics in the present disclosure.

The specific compound to be used in the present disclosure may be any coloring agent having the specific absorption characteristics. Among them, preferred is a methine coloring agent having the specific absorption characteristics.

Further, the specific compound is preferably an oxonol coloring agent having the specific absorption characteristics.

The specific compound is preferably an oxonol coloring agent which is a compound represented by General Formula (1).

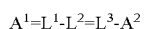

In General Formula (1), $A^1$ represents a keto form of an acidic nucleus selected from the group consisting of General Formulae (1-a) to (1-x). $A^2$ represents an enol form of an acidic nucleus selected from the group consisting of General Formulae (1-a) to (1-x), in which a hydroxyl group in the enol form may be dissociated.

$L^1$, $L^2$, and $L^3$ each independently represent a methine group which may be substituted.

Examples of the substituent which is allowed to be introduced into $L^1$, $L^2$, and $L^3$ include an alkyl group, an aryl group, and a halogen atom exemplified in the description of $R^1$ below. In a case where there are a plurality of substituents, the substituents may be the same as or different from each other. Further, two or more of the substituents may be bonded to each other to form a ring.

$M^+$ represents a hydrogen atom or a monovalent counter cation, and n represents the number required to make the positive charge number of M equal to the negative charge number of $A^1=L^1-L^2=L^3-A^2$.

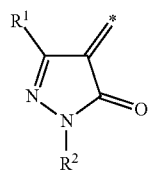 (1-a)

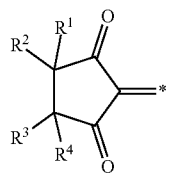 (1-b)

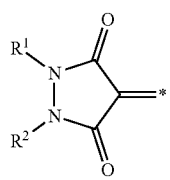 (1-c)

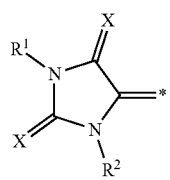 (1-d)

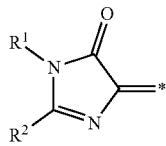 (1-e)

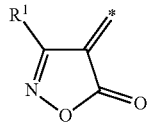 (1-f)

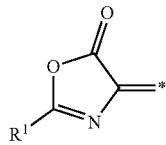 (1-g)

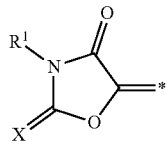 (1-h)

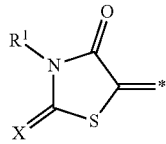 (1-i)

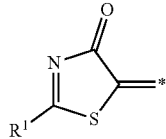 (1-j)

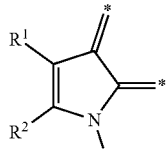 (1-k)

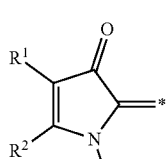 (1-l)

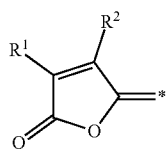 (1-m)

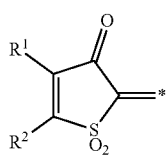 (1-n)

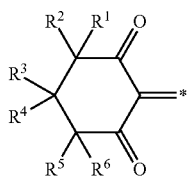 (1-o)

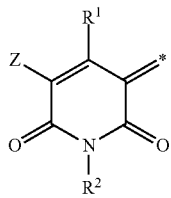 (1-p)

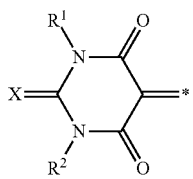 (1-q)

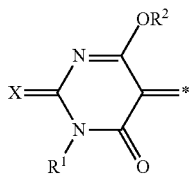 (1-r)

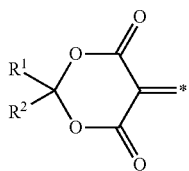 (1-s)

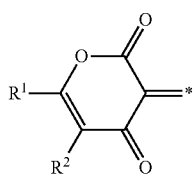 (1-t)

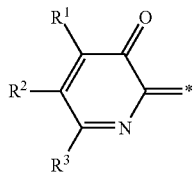 (1-u)

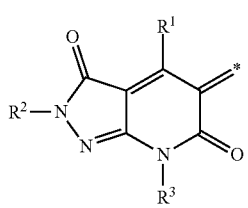 (1-v)

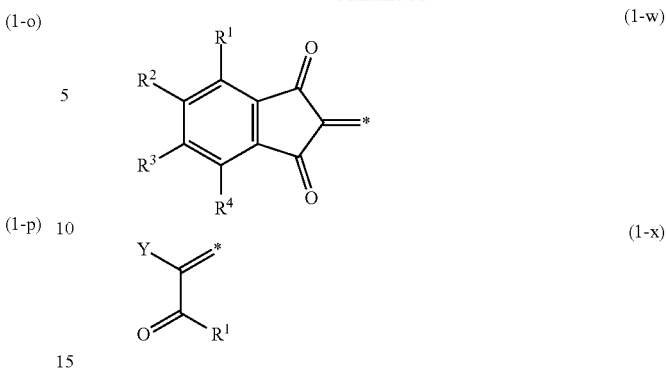

(1-w) (top), (1-x) (bottom)

In General Formulae (1-a) to (1-x), each * represents a position at which the keto form $A^1$ of the acidic nucleus is bonded to $L^1$ and the enol form $A^2$ of the acidic nucleus is bonded to $L^3$.

X represents an oxygen atom or a sulfur atom. Y represents an electron-withdrawing group. Z represents a hydrogen atom, a carbamoyl group, an alkyl group, an aryl group, a cyano group, a carboxyl group, an acyl group, an alkyloxycarbonyl group, an aryloxycarbonyl group, a halogen atom, an amino group, an acylamino group, an alkylsulfonyl group, an arylsulfonyl group, or a sulfo group. $R^1$, $R^2$, $R^3$, $R^4$, $R^5$, and $R^6$ each independently represent a hydrogen atom or a monovalent substituent.

General Formulae (1-a) to (1-x) will be described.

In General Formulae (1-a) to (1-x), X represents an oxygen atom or a sulfur atom. X is preferably an oxygen atom.

Y represents an electron-withdrawing group. The electron-withdrawing group refers to a substituent having a property of attracting electrons from a substitution position at a specific substitution position of a molecule and having an effect of reducing electron density. Examples of the electron-withdrawing group include groups having a halogen atom, a nitrile group, a carboxy group, a carbonyl group, a nitro group, or the like.

Specific examples of the electron-withdrawing group represented by Y include an acyl group, an acyloxy group, a carbamoyl group, an alkyloxycarbonyl group, an aryloxycarbonyl group, a cyano group, a nitro group, a dialkylphosphono group and a diarylphosphono group, a diarylphosphinyl group, an alkylsulfinyl group, an arylsulfinyl group, an alkylsulfonyl group, an arylsulfonyl group, a heterocyclic sulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another electron-withdrawing group having a Hammett substituent constant σp value of 0.2 or more, a heterocyclic group, a halogen atom, an azo group, or a selenocyanate group.

Among them, preferred is a substituent selected from the group consisting of a cyano group, an alkylsulfonyl group, an arylsulfonyl group, a heterocyclic sulfonyl group, an acyl group, a sulfamoyl group which may be substituted, a carbamoyl group which may be substituted, an alkyloxycarbonyl group, and an aryloxycarbonyl group.

Here, in a case where the sulfamoyl group or the carbamoyl group has a substituent, examples of the substituent include a substituted or unsubstituted alkyl group, a substituted or unsubstituted aryl group, and a substituted or unsubstituted heterocyclic group.

Z represents a hydrogen atom, a carbamoyl group, an alkyl group, an aryl group, a cyano group, a carboxyl group, an acyl group, an alkyloxycarbonyl group, an aryloxycarbonyl group, a halogen atom, an amino group, an acylamino group, an alkylsulfonyl group, an arylsulfonyl group, or a sulfo group. Z is preferably a hydrogen atom, a carbamoyl group, an alkyl group, a cyano group, an acyl group, a halogen atom, an acylamino group, an alkylsulfonyl group, or a sulfo group, and more preferably a hydrogen atom, a carbamoyl group, or a cyano group.

In a case where Z is a substituent other than a hydrogen atom, the substituent may further have a substituent.

In General Formulae (1-a) to (1-x), $R^1$, $R^2$, $R^3$, $R^4$, $R^5$, and $R^6$ each independently represent a hydrogen atom or a monovalent substituent.

In a case where $R^1$, $R^2$, $R^3$, $R^4$, $R^5$, and $R^6$ each independently represent a monovalent substituent, the monovalent substituent is a halogen atom, an alkyl group (including a cycloalkyl group, a bicycloalkyl group), an alkenyl group (including a cycloalkenyl group, a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imide group, a phosphonic acid group, a phosphino group, a phosphinyl group, a phosphinyloxy group, a phosphinylamino group, or a silyl group, and these substituents may be further substituted by the above substituents, and the substituents may be bonded to each other to form a ring.

Hereinafter, each of the exemplified substituents in a case where $R^1$, $R^2$, $R^3$, $R^4$, $R^5$, and $R^6$ are monovalent substituents will be described.

Examples of the halogen atom include a fluorine atom, a chlorine atom, a bromine atom, or an iodine atom.

The alkyl group may be linear, branched, or cyclic. Further, the alkyl group may be an alkyl group having a substituent or an unsubstituted alkyl group. In other words, the alkyl group in the monovalent substituent is used in the sense that it encompasses a cycloalkyl group, a bicycloalkyl group, and an alkyl group having a tricyclo structure which is a polycyclic structure or the like.

The alkyl groups in the substituents (for example, an alkyl group in an alkoxy group or an alkylthio group) which will be described below also represent alkyl groups having such a concept.

Specifically, the alkyl group is preferably an alkyl group having 1 to 30 carbon atoms, and examples thereof include a methyl group, an ethyl group, an n-propyl group, an i-propyl group, a t-butyl group, an n-octyl group, an eicosyl group, a benzyl group, a phenethyl group, a 2-chloroethyl group, a 2-cyanoethyl group, and a 2-ethylhexyl group. The cycloalkyl group is preferably a substituted or unsubstituted cycloalkyl group having 3 to 30 carbon atoms, and examples thereof include a cyclohexyl group, a cyclopentyl group, and a 4-n-dodecylcyclohexyl group. The bicycloalkyl group is preferably a substituted or unsubstituted bicycloalkyl group having 5 to 30 carbon atoms, i.e., a monovalent group obtained by removing one hydrogen atom from a bicycloalkene having 5 to 30 carbon atoms, and examples thereof include a bicyclo[1,2,2]heptan-2-yl group and a bicyclo[2,2,2]octan-3-yl group.

The alkenyl group may be linear, branched, or cyclic. Further, the alkenyl group may be an alkyl group having a substituent or an unsubstituted alkyl group. In other words, the alkenyl group in the monovalent substituent encompasses a cycloalkenyl group and a bicycloalkenyl group.

Specifically, the alkenyl group is preferably a substituted or unsubstituted alkenyl group having 2 to 30 carbon atoms, and examples thereof include a vinyl group, an allyl group, a prenyl group, a geranyl group, and an oleyl group. The cycloalkenyl group is preferably a substituted or unsubstituted cycloalkenyl group having 3 to 30 carbon atoms, i.e., a monovalent group obtained by removing one hydrogen atom from a cycloalkene having 3 to 30 carbon atoms, and examples thereof include a 2-cyclopenten-1-yl group and a 2-cyclohexen-1-yl group. The bicycloalkenyl group is a substituted or unsubstituted bicycloalkenyl group, preferably a substituted or unsubstituted bicycloalkenyl group having 5 to 30 carbon atoms, i.e., a monovalent group obtained by removing one hydrogen atom from a bicycloalkene having one double bond, and examples thereof include a bicyclo[2,2,1]hept-2-en-1-yl group and a bicyclo[2,2,2]oct-2-en-4-yl group.

The alkynyl group is preferably a substituted or unsubstituted alkynyl group having 2 to 30 carbon atoms, and examples thereof include an ethynyl group, a propargyl group, and a trimethylsilylethynyl group.

The aryl group is preferably a substituted or unsubstituted aryl group having 6 to 30 carbon atoms, and examples thereof include a phenyl group, a p-tolyl group, a naphthyl group, a m-chlorophenyl group, and an o-hexadecanoylaminophenyl group.

The heterocyclic group is preferably a monovalent group obtained by removing one hydrogen atom from a 5- or 6-membered substituted or unsubstituted aromatic or non-aromatic heterocyclic compound. Even more preferred is a 5- or 6-membered aromatic heterocyclic group having 3 to 30 carbon atoms, and examples thereof include a 2-furyl group, a 2-thienyl group, a 2-pyrimidinyl group, and a 2-benzothiazolyl group.

The alkoxy group is preferably a substituted or unsubstituted alkoxy group having 1 to 30 carbon atoms, and examples thereof include a methoxy group, an ethoxy group, an isopropoxy group, a t-butoxy group, an n-octyloxy group, and a 2-methoxyethoxy group.

The aryloxy group is preferably a substituted or unsubstituted aryloxy group having 6 to 30 carbon atoms, and examples thereof include a phenoxy group, a 2-methylphenoxy group, a 4-t-butylphenoxy group, a 3-nitrophenoxy group, and a 2-tetradecanoylaminophenoxy group.

The silyloxy group is preferably a substituted or unsubstituted silyloxy group having 0 to 20 carbon atoms, and examples thereof include a trimethylsilyloxy group and a diphenylmethylsilyloxy group.

The heterocyclic oxy group is preferably a substituted or unsubstituted heterocyclic oxy group having 2 to 30 carbon atoms, and examples thereof include a 1-phenyltetrazole-5-oxy group, and a 2-tetrahydropyranyloxy group.

The acyloxy group is preferably a formyloxy group, a substituted or unsubstituted alkylcarbonyloxy group having 2 to 30 carbon atoms, a substituted or unsubstituted arylcarbonyloxy group having 6 to 30 carbon atoms, and examples thereof include an acetyloxy group, a pivaloyloxy group, a stearoyloxy group, a benzoyloxy group, and a p-methoxyphenylcarbonyloxy group.

The carbamoyloxy group is preferably a substituted or unsubstituted carbamoyloxy group having 1 to 30 carbon atoms, and examples thereof include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

The alkoxycarbonyloxy group is preferably a substituted or unsubstituted alkoxycarbonyloxy group having 2 to 30 carbon atoms, and examples thereof include a methoxycarbonyloxy group, an ethoxycarbonyloxy group, a t-butoxycarbonyloxy group, and an n-octylcarbonyloxy group.

The aryloxycarbonyloxy group is preferably a substituted or unsubstituted aryloxycarbonyloxy group having 7 to 30 carbon atoms, and examples thereof include a phenoxycarbonyloxy group, a p-methoxyphenoxycarbonyloxy group, and a p-n-hexadecyloxyphenoxycarbonyloxy group.

The amino group encompasses, in addition to the amino group, an alkylamino group, an arylamino group, and a heterocyclic amino group, which are amino groups having an alkyl group, an aryl group, or a heterocyclic group.

The amino group is preferably an amino group, a substituted or unsubstituted alkylamino group having 1 to 30 carbon atoms, or a substituted or unsubstituted anilino group having 6 to 30 carbon atoms, and examples thereof include a methylamino group, a dimethylamino group, an anilino group, an N-methyl-anilino group, a diphenylamino group, and a triazinylamino group.

The acylamino group is preferably a formylamino group, a substituted or unsubstituted alkylcarbonylamino group having 1 to 30 carbon atoms, or a substituted or unsubstituted arylcarbonylamino group having 6 to 30 carbon atoms, and examples thereof include an acetylamino group, a pivaloylamino group, a lauroylamino group, a benzoylamino group, and a 3,4,5-tri-n-octyloxyphenylcarbonylamino group.

The aminocarbonylamino group is preferably a substituted or unsubstituted aminocarbonylamino group having 1 to 30 carbon atoms, and examples thereof include a carbamoylamino group, an N,N-dimethylaminocarbonylamino group, an N,N-diethylaminocarbonylamino group, and a morpholinocarbonylamino group.

The alkoxycarbonylamino group is preferably a substituted or unsubstituted alkoxycarbonylamino group having 2 to 30 carbon atoms, and examples thereof include a methoxycarbonylamino group, an ethoxycarbonylamino group, a t-butoxycarbonylamino group, an n-octadecyloxycarbonylamino group, and an N-methyl-methoxycarbonylamino group.

The aryloxycarbonylamino group is preferably a substituted or unsubstituted aryloxycarbonylamino group having 7 to 30 carbon atoms, and examples thereof include a phenoxycarbonylamino group, a p-chlorophenoxycarbonylamino group, and an m-n-octyloxyphenoxycarbonylamino group.

The sulfamoylamino group is preferably a substituted or unsubstituted sulfamoylamino group having 0 to 30 carbon atoms, and examples thereof include a sulfamoylamino group, an N,N-dimethylaminosulfonylamino group, and an N-n-octylaminosulfonylamino group.

The alkylsulfonylamino group or arylsulfonylamino group is preferably a substituted or unsubstituted alkylsulfonylamino group having 1 to 30 carbon atoms, or a substituted or unsubstituted arylsulfonylamino group having 6 to 30 carbon atoms, and examples thereof include a methylsulfonylamino group, a butylsulfonylamino group, a phenylsulfonylamino group, a 2,3,5-trichlorophenylsulfonylamino group, and a p-methylphenylsulfonylamino group.

The alkylthio group is preferably a substituted or unsubstituted alkylthio group having 1 to 30 carbon atoms, and examples thereof include a methylthio group, an ethylthio group, and an n-hexadecylthio group.

The arylthio group is preferably a substituted or unsubstituted arylthio group having 6 to 30 carbon atoms, and examples thereof include a phenylthio group, a p-chlorophenylthio group, and an m-methoxyphenylthio group.

The heterocyclic thio group is preferably a substituted or unsubstituted heterocyclic thio group having 2 to 30 carbon atoms, and examples thereof include a 2-benzothiazolylthio group and a 1-phenyltetrazol-5-ylthio group.

The sulfamoyl group is preferably a substituted or unsubstituted sulfamoyl group having 0 to 30 carbon atoms, and examples thereof include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group.

The alkylsulfinyl group or arylsulfinyl group is preferably a substituted or unsubstituted alkylsulfinyl group having 1 to 30 carbon atoms, or a substituted or unsubstituted arylsulfinyl group having 6 to 30 carbon atoms, and examples thereof include a methylsulfinyl group, an ethylsulfinyl group, a phenylsulfinyl group, and a p-methylphenylsulfinyl group.

The alkylsulfonyl group or arylsulfonyl group is preferably a substituted or unsubstituted alkylsulfonyl group having 1 to 30 carbon atoms, or a substituted or unsubstituted arylsulfonyl group having 6 to 30 carbon atoms, and examples thereof include a methylsulfonyl group, an ethylsulfonyl group, a phenylsulfonyl group, and a p-methylphenylsulfonyl group.

The acyl group is preferably a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 2 to 30 carbon atoms in which the heterocycle is bonded to the carbonyl group at a carbon atom, and examples thereof include an acetyl group, a pivaloyl group, a 2-chloroacetyl group, a stearoyl group, a benzoyl group, a p-n-octyloxyphenylcarbonyl group, a 2-pyridyl group, and a 2-furylcarbonyl group.

The aryloxycarbonyl group is preferably a substituted or unsubstituted aryloxycarbonyl group having 7 to 30 carbon atoms, and examples thereof include a phenoxycarbonyl group, an o-chlorophenoxycarbonyl group, an m-nitrophenoxycarbonyl group, and a p-t-butylphenoxycarbonyl group.

The alkoxycarbonyl group is preferably a substituted or unsubstituted alkoxycarbonyl group having 2 to 30 carbon atoms, and examples thereof include a methoxycarbonyl group, an ethoxycarbonyl group, a t-butoxycarbonyl group, and an n-octadecyloxycarbonyl group.

The carbamoyl group is preferably a substituted or unsubstituted carbamoyl group having 1 to 30 carbon atoms, and examples thereof include a carbamoyl group, an N-methylcarbamoyl group, an N,N-dimethylcarbamoyl group, an N,N-di-n-octylcarbamoyl group, and an N-(methylsulfonyl)carbamoyl group.

The arylazo group or heterocyclic azo group is preferably a substituted or unsubstituted arylazo group having 6 to 30 carbon atoms, or a substituted or unsubstituted heterocyclic azo group having 3 to 30 carbon atoms, and examples thereof include phenylazo, p-chlorophenylazo, and 5-ethylthio-1,3,4-thiadiazol-2-ylazo.

The imide group is preferably, for example, an N-succinimide group or an N-phthalimide group.

The phosphino group is preferably a substituted or unsubstituted phosphino group having 0 to 30 carbon atoms, and examples thereof include a dimethylphosphino group, a diphenylphosphino group, and a methylphenoxyphosphino group.

The phosphinyl group is preferably a substituted or unsubstituted phosphinyl group having 0 to 30 carbon atoms, and examples thereof include a phosphinyl group, a dioctyloxyphosphinyl group, and a diethoxyphosphinyl group.

The phosphinyloxy group is preferably a substituted or unsubstituted phosphinyloxy group having 0 to 30 carbon atoms, and examples thereof include a diphenoxyphosphinyloxy group and a dioctyloxyphosphinyloxy group.

The phosphinylamino group is preferably a substituted or unsubstituted phosphinylamino group having 0 to 30 carbon atoms, and examples thereof include a dimethoxyphosphinylamino group and a dimethylaminophosphinylamino group.

The silyl group is preferably a substituted or unsubstituted silyl group having 0 to 30 carbon atoms, and examples thereof include a trimethylsilyl group, a t-butyldimethylsilyl group, and a phenyldimethylsilyl group.

In General Formulae (1-a) to (1-x), $R^1$, $R^2$, $R^3$, $R^4$, $R^5$, and $R^6$ are each preferably a halogen atom, an alkyl group, an aryl group, a heterocyclic group, a carboxyl group, an acyl group, an alkyloxycarbonyl group, an aryloxycarbonyl group, a carbamoyl group, a cyano group, an amino group, an acylamino group, an alkylsulfonylamino group, an arylsulfonylamino group, an aminocarbonylamino group, a carbamoyloxy group, a hydroxyl group, an alkoxy group, an aryloxy group, a heterocyclic oxy group, an acyloxy group, or a sulfamoyl group, more preferably a hydrogen atom, an alkyl group, an aryl group, a heterocyclic group, a carboxyl group, an acyl group, an alkyloxycarbonyl group, a carbamoyl group, a cyano group, an amino group, an acylamino group, an alkylsulfonylamino group, an arylsulfonylamino group, a hydroxyl group, an alkoxy group, or a sulfamoyl group, and even more preferably a hydrogen atom, an alkyl group, an aryl group, a heterocyclic group, a carboxyl group, an alkyloxycarbonyl group, a carbamoyl group, a cyano group, an acylamino group, a hydroxyl group, or an alkoxy group.

From the viewpoints that the absorption peak of the specific compound tends to be steep and the half-width thereof can be easily kept within an appropriate range, both $A^1$ and $A^2$ preferably have a structure having a ring structure selected from the group consisting of a 5-membered ring, a 6-membered ring, and a condensed ring structure, and a structure derived from an acidic nucleus having a structure having an electron-withdrawing group. Among the ring structures, $A^1$ and $A^2$ more preferably have a structure having a saturated 5-membered ring, and even more preferably have a structure having a saturated 5-membered ring in which carbonyl groups are in a symmetric position.

From the viewpoint of synthetic suitability, $A^1$ and $A^2$ are preferably a keto form and an enol form derived from acidic nuclei having the same structure.

In General Formula (1), from the viewpoints that the absorption peak at the maximum absorption wavelength tends to be steep, the color value is high, and the durability of the specific compound is high, $A^1$ is preferably a keto form of an acidic nucleus selected from the group consisting of (1-b), (1-c), (14), (1-o), (1-q), (1-r), (1-v), and (1-w) among General Formulae (1-a) to (1-x) described above, and $A^2$ is preferably an enol form of an acidic nucleus selected from the group consisting of (1-b), (1-c), (1-f), (1-o), (1-q), (1-r), (1-v), and (1-w), and it is even more preferable that $A^1$ represents a keto form of an acidic nucleus selected from the group consisting of (1-b), (1-c), and (1-q) and $A^2$ represents an enol form of an acidic nucleus selected from the group consisting of (1-b), (1-c), and (1-q).

In General Formula (1), examples of the counter cation M forming the salt include ammonium ion, an alkali metal ion (e.g., lithium ion, sodium ion, potassium ion) and an organic cation (e.g., tetramethylammonium ion, tetraethylammonium ion, tetrabutylammonium ion, triethylammonium ion, tributylammonium ion, trihexylammonium ion, trioctylammonium ion, tetramethylguanidinium ion, tetramethylphosphonium ion).

The counter cation M is preferably an organic cation, in particular, more preferably tetraalkylammonium ion or trialkylammonium ion.

Examples of the specific compound represented by General Formula (1) will be shown below by specifying General Formulae representing their structures and the substituents in the respective General Formulae. The maximum absorption wavelength and the half-width of each compound measured by the method described above are shown together.

The specific compound represented by General Formula (1) in the present disclosure is not limited to the following examples.

In the formulae below, "Me" represents a methyl group, "Et" represents an ethyl group, "Bu" represents a butyl group, "Pr" represents a propyl group, "Ph" represents a phenyl group, and "DBU" represents 1,8-diazabicycloundecene (1,8-Diazabicyclo(5,4,0)undec-7-ene). H represents a hydrogen atom.

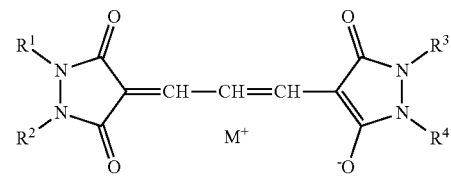

| Specific compound | $R^1$ | $R^2$ | $R^3$ | $R^4$ | M | Maximum absorption wavelength | Half-width |
|---|---|---|---|---|---|---|---|
| I-1 | Me | Me | Me | Me | $HNEt_3$ | 484 nm | 30 nm |
| I-2 | Et | Et | Et | Et | $HNEt_3$ | 485 nm | 30 nm |
| I-3 | n-Bu | n-Bu | n-Bu | n-Bu | $HNBu_3$ | 486 nm | 30 nm |
| I-4 | n-$C_6H_{13}$ | n-$C_6H_{13}$ | n-$C_6H_{13}$ | n-$C_6H_{13}$ | HDBU | 486 nm | 31 nm |

-continued

| Specific compound | $R^1$ | $R^2$ | $R^3$ | $R^4$ | M | Maximum absorption wavelength | Half-width |
|---|---|---|---|---|---|---|---|
| I-5 | $n\text{-}C_8H_{17}$ | $n\text{-}C_8H_{17}$ | $n\text{-}C_8H_{17}$ | $n\text{-}C_8H_{17}$ | $HNBu_3$ | 486 nm | 31 nm |
| I-6 | Ph | Ph | Ph | Ph | $HNEt_3$ | 494 nm | 30 nm |
| I-7 | $4\text{-}n\text{-}C_6H_{13}Ph$ | $4\text{-}n\text{-}C_6H_{13}Ph$ | $4\text{-}n\text{-}C_6H_{13}Ph$ | $4\text{-}n\text{-}C_6H_{13}Ph$ | $HNEt_3$ | 494 nm | 30 nm |

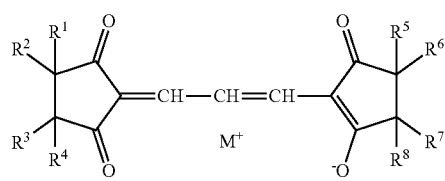

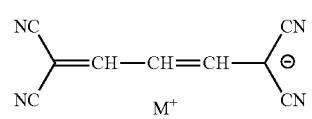

(2)

In General Formula (2), $M^+$ represents a hydrogen atom or a monovalent counter cation.

| Specific compound | $R^1$ | $R^2$ | $R^3$ | $R^4$ | $R^5$ | $R^6$ | $R^7$ | $R^8$ | M | Maximum absorption wavelength | Half-width |
|---|---|---|---|---|---|---|---|---|---|---|---|
| H-1 | H | H | H | H | H | H | H | H | $HNEt_3$ | 485 nm | 30 nm |
| H-2 | Me | Me | Me | Me | Me | Me | Me | Me | $HNEt_3$ | 480 nm | 32 nm |
| H-3 | Et | Et | Et | Et | Et | Et | Et | Et | $HNEt_3$ | 480 nm | 32 nm |
| H-4 | n-Pr | n-Pr | n-Pr | n-Pr | n-Pr | n-Pr | n-Pr | n-Pr | $HNBU_3$ | 480 nm | 31 nm |
| H-5 | Et | H | Et | H | Et | H | Et | H | $HNEt_3$ | 482 nm | 31 nm |
| H-6 | n-Bu | H | n-Bu | H | n-Bu | H | n-Bu | H | $HNEt_3$ | 482 nm | 31 nm |
| H-7 | $n\text{-}C_6H_{13}$ | H | $n\text{-}C_6H_{13}$ | H | $n\text{-}C_6H_{13}$ | H | $n\text{-}C_6H_{13}$ | H | HDBU | 482 nm | 31 nm |

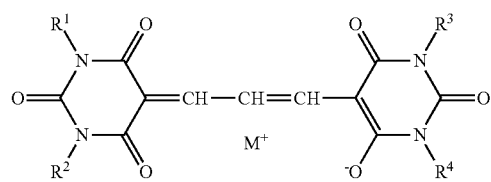

Examples of the counter cation M forming the salt in a case where M represents a monovalent cation include ammonium ion, an alkali metal ion (e.g., lithium ion, sodium ion, potassium ion) and an organic cation (e.g., tetramethylammonium ion, tetraethylammonium ion, tetrabutylammonium ion, triethylammonium ion, tributylammonium ion, trihexylammonium ion, trioctylammonium ion, tetramethylguanidinium ion, tetramethylphosphonium ion).

| Specific compound | $R^1$ | $R^2$ | $R^3$ | $R^4$ | M | Maximum absorption wavelength | Half-width |
|---|---|---|---|---|---|---|---|
| J-1 | Me | Me | Me | Me | $HNEt_3$ | 487 nm | 30 nm |
| J-2 | Et | Et | Et | Et | $NBu_4$ | 488 nm | 30 nm |
| J-3 | n-Bu | n-Bu | n-Bu | n-Bu | $HNBu_3$ | 488 nm | 30 nm |
| J-4 | $n\text{-}C_6H_{13}$ | $n\text{-}C_6H_{13}$ | $n\text{-}C_6H_{13}$ | $n\text{-}C_6H_{13}$ | HDBU | 488 nm | 30 nm |
| J-5 | $n\text{-}C_8H_{17}$ | $n\text{-}C_8H_{17}$ | $n\text{-}C_8H_{17}$ | $n\text{-}C_8H_{17}$ | $HNBu_3$ | 488 nm | 30 nm |
| J-6 | $n\text{-}C_8H_{17}$ | Ph | $n\text{-}C_8H_{17}$ | Ph | $HN(n\text{-}C_6H_{13})_3$ | 490 nm | 30 nm |
| J-7 | $4\text{-}n\text{-}C_6H_{13}Ph$ | $4\text{-}n\text{-}C_6H_{13}Ph$ | $4\text{-}n\text{-}C_6H_{13}Ph$ | $4\text{-}n\text{-}C_6H_{13}Ph$ | $HNEt_3$ | 492 nm | 32 nm |

Among the specific compounds represented by General Formula (1) exemplified above, from the viewpoints that the maximum absorption wavelength is on the longer wavelength side and the half-width falls within in the appropriate range, preferred are the specific compounds (I-2) to (I-5), (I-7), (H-3), (H-4), (J-3), (J-4), and (J-7), more preferred are the specific compounds (I-2) to (I-5), (I-7), (J-3), (J-4), and (J-7), and even more preferred is the specific compound (I-7).

Another preferred example of the specific compound is a methine coloring agent which is a compound represented by General Formula (2).

The counter cation M is preferably an organic cation, in particular, more preferably a tetraalkylammonium ion or a trialkylammonium ion having an alkyl group having 1 to 5 carbon atoms, and even more preferably a tetraalkylammonium ion or a trialkylammonium ion having an ethyl group or a butyl group.

Examples of the specific compound represented by General Formula (2) will be shown below by specifying General Formulae representing their structures and the substituents in the respective General Formulae. The maximum absorption wavelength and the half-width of each compound measured by the method described above are shown together.

The specific compound represented by General Formula (2) in the present disclosure is not limited to the following examples.

In the formulae below, "Me" represents a methyl group, "Et" represents an ethyl group, "Bu" represents a butyl group, "Pr" represents a propyl group, "Ph" represents a phenyl group, and "DBU" represents 1,8-diazabicycloundecene. H represents a hydrogen atom.

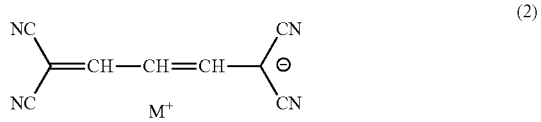

(2)

| Specific compound | M | Maximum absorption wavelength | Half-width |
|---|---|---|---|
| K-1 | HNEt$_3$ | 440 nm | 32 nm |
| K-2 | NBu$_4$ | 440 nm | 32 nm |

Among the specific compounds represented by General Formula (2) exemplified above, the specific compound (K-2) is preferable from the viewpoints that the maximum absorption wavelength is on the longer wavelength side and the half-width falls within in the appropriate range.

The lens for spectacles of the present disclosure may contain only one kind of the specific compound or may contain two or more kinds thereof.

The content of the specific compound in the lens for spectacles of the present disclosure is not particularly limited. The content of the specific compound in the lens for spectacles is preferably 0.01 parts by mass to 1.0 part by mass, more preferably 0.01 parts by mass to 0.5 parts by mass, and even more preferably 0.05 parts by mass to 0.2 parts by mass, with respect to 100 parts by mass of the resin, for example.

The specific compound in the lens for spectacles of the present disclosure has the maximum absorption wavelength in a wavelength range of 400 nm to 500 nm, has a high molar absorption coefficient in the above absorption wavelength range, and has a half-width in the range of 10 nm or more and less than 40 nm. Therefore, in a case where the content of the specific compound in the lens for spectacles of the present disclosure is in the above range, it is possible to satisfactorily block blue light in the above wavelength range, and suppress undesired coloring of the lens for spectacles.

[Resin]

The lens for spectacles of the present disclosure contains a resin.

The resin is not particularly limited, as long as it is a resin that satisfies physical properties required for the lens for spectacles such as transparency, refractive index, workability, and hardness after curing.

The resin used for the lens for spectacles of the present disclosure may be either a resin having a high refractive index or a resin having a low refractive index.

The resin may be a thermoplastic resin (for example, a polycarbonate resin) or a thermosetting resin (for example, a urethane resin).

For use in the lens for spectacles, the resin is preferably transparent, that is, has a high visible light transmittance.

In the present specification, the expression "the resin is transparent" means that the lens for spectacles containing the resin has an average transmittance of 80% or more in the wavelength range of 430 nm to 700 nm and a transmittance of 75% or more in the wavelength range of 430 nm to 700 nm. The average transmittance in the wavelength range of 430 nm to 700 nm is preferably 85% or more, and more preferably 90% or more.

The average transmittance of the lens for spectacles from 430 nm to 700 nm can be obtained by measuring the optical spectrum of the molded lens for spectacles using a UV/vis spectrometer, for example, UV/vis spectrometer UV3100 manufactured by Shimadzu Corporation, and calculating the average value of the measurement results of the transmittance for each wavelength 1 nm in the above wavelength range. Further, in the above measurement results, it can be confirmed that the condition that the transmittance is 75% or more in the wavelength range of 430 nm to 700 nm is satisfied in a case where the measurement results of the transmittance for each wavelength 1 nm are 75% or more.

The specific compound in the present disclosure has almost no absorption in the wavelength range of visible light, and thus the transparency in the resin contained in the lens for spectacles can be estimated by measuring the transmittance and average transmittance of the lens for spectacles at each wavelength in the wavelength range of 430 nm to 700 nm.

Suitable examples of transparent resins include cellulose esters such as diacetyl cellulose, triacetyl cellulose, propionyl cellulose, butyryl cellulose, acetylpropionyl cellulose, and nitrocellulose, polyacrylic acid (PA), polycarbonate (PC), polyethylene terephthalate (PET), polyethylene naphthalate (PEN), polybutylene terephthalate (PBT), poly-1,4-cyclohexanedimethylene terephthalate, polyethylene-1,2-diphenoxyethane-4,4'-dicarboxylate, polystyrenes such as syndiotactic polystyrene, polyolefins such as polyethylene, polypropylene, polymethylpentene, acrylic resins such as polymethylmethacrylate (PMMA), polysulfone, polyethersulfone, polyvinyl butyral, ethylene vinyl acetate, polyetherketone, polyetherimide, and polyoxyethylene.

Among them, preferred are cellulose esters, PC, polyesters, polyolefins, and acrylic resins, and more preferred are PC and polyesters.

Among them, the resin contained in the lens for spectacles is preferably a resin having a high refractive index. From the viewpoint of a high refractive index, the resin is preferably at least one resin selected from the group consisting of a urethane resin, an episulfide resin, and a polycarbonate resin and more preferably at least one resin selected from a urethane resin or an episulfide resin.

Further, the urethane resin is particularly preferably a thiourethane resin.

The thiourethane resin and the episulfide resin are widely used as materials for the lens for spectacles, but have poor compatibility with an ultraviolet absorbing agent used in the lens for spectacles in the related art and, particularly, are susceptible to precipitation of the ultraviolet absorbing agent.

The lens for spectacles of the present disclosure suppresses the precipitation of a specific coloring agent caused by deterioration in compatibility between the specific compound and the resin even in a case where the resin contains at least one selected from a thiourethane resin or an episulfide resin and also suppresses the phase separation between the specific compound and the resin due to the twist of the molecule described above. Furthermore, it is considered that since the specific compound has a narrow half-width and low absorption on the short wavelength side, the lens for spectacles has satisfactory transparency, and the satisfactory transparency of the lens for spectacles is maintained for a long period of time, and thus a change in tint is hardly recognized in a case where an object is viewed through the lens for spectacles.

The resin contained in the lens for spectacles of the present disclosure may be a resin having a refractive index higher than 1.65.

For details of the thiourethane resin and the episulfide resin suitable as the resin of the lens for spectacles of the present disclosure, refer to the disclosure of JP1996-003267A (JP-H08-003267A), JP1999-158229A (JP-H11-158229A), JP2009-256692A, JP2007-238952A, JP2009-074624A, JP2015-212395A, and JP2016-084381A.

As the resin, a commercially available resin can be used.

Examples of commercially available products of the resins include PANLITE (registered trademark) L-1250WP [trade name, aromatic polycarbonate resin powder, Teijin Limited: refractive index n=1.58], PANLITE (registered trademark) SP-1516 (trade name, Teijin Limited) IUPIZETA (registered trademark) EP-5000 (trade name, Mitsubishi Gas Chemical Company Inc.), and IUPIZETA (registered trademark) EP-4000 (trade name, Mitsubishi Gas Chemical Company Inc.).

Further, the resin may also be a resin formed using a precursor monomer of a commercially available resin.

Examples of commercially available products of the precursor monomer of the resin include MR-6 (registered trademark) [refractive index n=1.59], MR-7 (registered trademark) [refractive index: 1.67], MR-8 (registered trademark) [refractive index: 1.60] MR-10 (registered trademark) [refractive index: 1.67], and MR-174 (registered trademark) [refractive index: 1.74] (above trade names, Mitsui Chemicals, Inc.) which are precursor monomers of the thiourethane resin. Further, examples thereof also include LUMIPLUS (registered trademark) LPB-1102 [refractive index n=1.71] [above trade name, Mitsubishi Gas Chemical Company Inc.].

The lens for spectacles of the present disclosure may contain only one kind of the resin or may contain two or more kinds thereof.

The content of the resin in the lens for spectacles according to the present disclosure is not particularly limited, and, for example, is preferably 70 mass % to 99.99 mass %, more preferably 80 mass % to 99.99 mass %, and even more preferably 90 mass % to 99.99 mass %, with respect to the total mass of the lens for spectacles.

In a case where the content of the resin in the lens for spectacles according to the present disclosure is in the above range, it is possible to produce a lightweight and thin lens.

[Other Ultraviolet Absorbing Agent]

The lens for spectacles of the present disclosure may contain a compound having an ultraviolet absorbing ability (hereinafter, also referred to as "other ultraviolet absorbing agent") other than the specific compound described above.

Adding another ultraviolet absorbing agent allows the lens for spectacles of the present disclosure to block blue light in a wide range of the ultraviolet region and the visible region.

The other ultraviolet absorbing agent is not particularly limited, as long as the ultraviolet absorbing agent is a known ultraviolet absorbing agent used for the lens for spectacles.

Examples of the other ultraviolet absorbing agent include ultraviolet absorbing agents such as a triazine compound (that is, a triazine ultraviolet absorbing agent), a benzotriazole compound (that is, a benzotriazole ultraviolet absorbing agent), a benzophenone compound (that is, a benzophenone ultraviolet absorbing agent), a cyanine compound (that is, a cyanine ultraviolet absorbing agent), a dibenzoylmethane compound (that is, a dibenzoylmethane ultraviolet absorbing agent), a cinnamic acid compound (that is, a cinnamic acid ultraviolet absorbing agent), an acrylate compound (that is, an acrylate ultraviolet absorbing agent), a benzoate ester compound (that is, a benzoate ester ultraviolet absorbing agent), an oxalic acid diamide compound (that is, an oxalic acid diamide ultraviolet absorbing agent), a formamidine compound (that is, a formamidine ultraviolet absorbing agent), a benzoxazole compound (that is, a benzoxazole ultraviolet absorbing agent), a benzoxazinone compound (that is, a benzoxazinone ultraviolet absorbing agent), and a benzodithiol compound (that is, a benzodithiol ultraviolet absorbing agent). For details of these ultraviolet absorbing agents, refer to "Monthly Fine Chemicals" May 2004, pages 28 to 38, "New Development of Functional Additives for Polymers" published by Toray Research Center Research Division, (Toray Research Center, 1999) pages 96 to 140, "Development of Polymer Additives And Environmental Measures" edited by Okachi Junichi, (CMC Publishing Co., Ltd., 2003) pages 54 to 64, and "Polymer Deterioration/Discoloring Mechanism and Stabilization Technology Thereof—Know-How Collection" (Technical Information Institute Co., Ltd., 2006) published by Technical Information Institute Co., Ltd., for example.

Further, specific examples of the benzoxazole compound include compounds disclosed in JP4311869B, specific examples of the benzoxazinone compound include compounds disclosed in JP5591453B and JP5250289B, and specific examples of the benzodithiol compound include compounds disclosed in JP5450994B and JP5364311B.

Among these, the lens for spectacles of the present disclosure preferably contains an ultraviolet absorbing agent selected from the group consisting of a benzotriazole compound and a triazine compound.

The other ultraviolet absorbing agent is particularly preferably an ultraviolet absorbing agent having a maximum absorption wavelength of 350 nm or less.

Adding an ultraviolet absorbing agent having a maximum absorption wavelength of 350 nm or less as the other ultraviolet absorbing agent allows the lens for spectacles of the present disclosure to suppress a change in transmittance of light having a wavelength of 400 nm due to the irradiation with the light having a wavelength of 350 nm or less (that is, the light resistance of the specific compound is improved).

There are two possible causes for the transmittance of light having a wavelength of 400 nm of the lens for spectacles containing the specific compound described above to be changed by irradiation with light having a wavelength of 350 µm or less: (1) the specific compound is directly decomposed by light having a wavelength of 400 nm; and (2) the resin is decomposed by light having a short wavelength of 350 nm or less, and the specific compound is decomposed by a decomposition product of the resin.

Although the specific compound can sufficiently block blue light having a wavelength of 400 nm to 500 nm, the specific compound has a property of transmitting ultraviolet light (hereinafter, sometimes referred to as UV light) in a wavelength range of 300 nm to 350 nm to some extent. Therefore, in the lens for spectacles of the present disclosure, the cause (2) is solved by using the specific compound in combination with the ultraviolet absorbing agent having a maximum absorption wavelength of 350 nm or less (for example, an ultraviolet absorbing agent having a property of blocking UV light in a wavelength range of 300 nm to 350 nm). Specifically, the decomposition of the resin by light having a short wavelength of 350 nm or less is suppressed by the ultraviolet absorbing agent having a maximum absorption wavelength of 350 nm or less, and thus the decomposition of the specific compound by the decomposition product of the resin is suppressed.

In the case of containing the other ultraviolet absorbing agent, the lens for spectacles of the present disclosure may contain only one kind of the other ultraviolet absorbing agent or may contain two or more kinds thereof.

In a case where the lens for spectacles of the present disclosure contains the other ultraviolet absorbing agent, the content of the other ultraviolet absorbing agent in the lens for spectacles is appropriately set according to the kind of the ultraviolet absorbing agent selected.

Generally, the content of the other ultraviolet absorbing agent in the lens for spectacles of the present disclosure is preferably 0.01 mass % to 1.0 mass % with respect to the total mass of the resin for one kind of the other ultraviolet absorbing agent.

In a case where the lens for spectacles of the present disclosure contains two or more kinds of the other ultraviolet absorbing agents, the total content of the other ultraviolet absorbing agents in the lens for spectacles of the present disclosure is preferably 0.01 mass % to 3.0 mass % with respect to the total mass of the resin.

In a case where the total content of the other ultraviolet absorbing agent in the lens for spectacles of the present disclosure is in the above range, the occurrence of haze and the yellowish tint are suppressed and the blue light in a wide range of the ultraviolet region can be blocked in a satisfactory manner.

[Other Components]

The lens for spectacles of the present disclosure may contain a component other than the component described above (so-called, other additives).

Examples of the other additive include a plasticizer, an antidegradant (for example, an antioxidant, a peroxide decomposer, a radical inhibitor, a metal deactivator, an acid scavenger, and amine), a dye other than the specific compound, an internal release agent, a deodorant, and a flame retardant.

[Method of Manufacturing Lens for Spectacles]

A method of manufacturing the lens for spectacles of the present disclosure is not particularly limited, as long as the lens for spectacles of the present disclosure described above can be manufactured.

There is no particular limitation on the aspects in which the lens for spectacles contains the specific compound. For example, the specific compound may be contained by kneading in a resin, may be contained by impregnating the specific compound in a lens for spectacles molded with a resin in advance, or may be contained by laminating a layer containing the specific compound in a lens for spectacles molded with a resin. The lamination of a layer containing a specific compound may be carried out by applying a coating liquid composition containing the specific compound on a lens for spectacles and drying the coating liquid composition, or may be carried out by separately forming a resin layer in which a specific compound is kneaded into a resin, and transfer the resin layer onto a lens for spectacles.

Among them, the specific compound is preferably kneaded into a resin from the viewpoints of durability and uniform dispersibility of the specific compound.

For example, in a case where the resin contained in the lens for spectacles is a thermoplastic resin, the lens for spectacles of the present disclosure can be manufactured by kneading and molding a resin composition containing the resin, a specific compound, and, as necessary, another ultraviolet absorbing agent and another additive as optional components into pellets using a melt extruder, and applying a known molding method such as an injection molding method using the obtained pellet-shaped resin composition.

For example, in a case where the resin contained in the lens for spectacles is a thermosetting resin, the lens for spectacles of the present disclosure can be manufactured by preparing a resin composition containing a monomer as a precursor of the resin, a specific compound, a polymerization catalyst (for example, dibutyltin dichloride), and, as necessary, another ultraviolet absorbing agent and another additive as optional components, filling the obtained resin composition into a molding die (hereinafter, sometimes referred to a mold), and curing the resin composition by heating.

[Spectacles]

The spectacles of the present disclosure comprise the lens for spectacles of the present disclosure described above.

In other words, the spectacles of the present disclosure have a configuration in which the lens for spectacles of the present disclosure described above is mounted on an appropriate spectacle frame.

According to the spectacles of the present disclosure, the lens for spectacles mounted on the spectacles can block blue light in the wavelength range of at least 400 nm to 500 nm, and thus reduction of eye fatigue caused by blue light in a case where an operation of viewing a display of an image display device is performed for a long period of time can be expected.

Further, according to the spectacles of the present disclosure, a change in tint is hardly recognized in a case where an object is viewed through the lens.

Furthermore, since the specific compound has a half-width at the maximum absorption wavelength in the range of 10 nm or more and less than 40 nm, phase separation caused by molecular vibration and a decrease in transparency of the lens for spectacles caused by the phase separation are suppressed even in a case where the specific compound is used for a long period of time, so that the spectacles of the present disclosure also have an advantage of excellent durability.

EXAMPLES

Hereinafter, the present invention will be described more specifically with reference to the Examples, but the present invention is not limited to the following Examples without departing from the gist thereof.

[Production of Lens]

Example 1

100 parts by mass of MR-7 (registered trademark) [trade name, refractive index: 1.67, Mitsui Chemicals, Inc.] as a precursor monomer of a thiourethane resin, 0.1 parts by mass of the specific compound 1-2 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced.

Visual observation confirmed that the produced lens for spectacles was transparent.

Example 2, Example 4 to Example 9, and Example 11 and Example 12

Lenses for spectacles were produced in the same manner as in Example 1 except that the specific compound and the resin used in Example 1 were changed as shown in Table 2 below.

Visual observation of the produced lenses for spectacles confirmed that all of the lenses for spectacles were transparent.

Example 3

100 parts by mass of MR-7 (registered trademark) [trade name, refractive index: 1.67, Mitsui Chemicals, Inc.] as a precursor monomer of a thiourethane resin, 0.1 parts by mass of the specific compound 1-3 described above, 0.05 parts by mass of a compound UV-1 (a compound having the following structure) as another ultraviolet absorbing agent, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

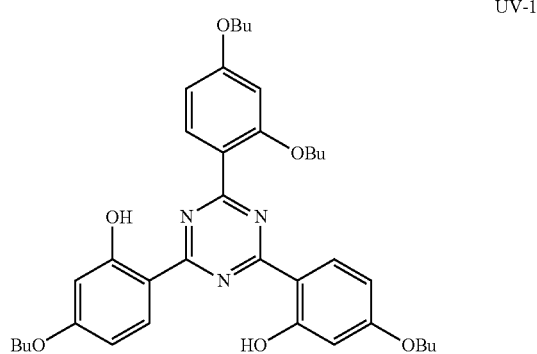

Example 10

100 parts by mass of MR-7 (registered trademark) [trade name, refractive index: 1.67, Mitsui Chemicals, Inc.] as a precursor monomer of a thiourethane resin, 0.1 parts by mass of the specific compound J-3 described above, 0.05 parts by mass of UV-1 (a compound having the above structure) as another ultraviolet absorbing agent, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 13

100 parts by mass of MR-8 (registered trademark) [trade name, refractive index: 1.60, Mitsui Chemicals, Inc.] as a precursor monomer of a thiourethane resin, 0.1 parts by mass of the specific compound 1-3 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 14

100 parts by mass of PANLITE (registered trademark) L-1250WP [trade name, an aromatic polycarbonate resin powder manufactured by an interfacial condensation polymerization method from bisphenol and phosgene, viscosity average molecular weight: 24,000, Teijin Chemicals Limited] as a polycarbonate resin (refractive index n=1.58), 0.1 parts by mass of the specific compound 1-3 described above, and 0.01 parts by mass of dibutyltin dichloride as a polymerization catalyst were mixed using a blender to obtain a resin composition. The obtained resin composition was melt-kneaded with a vented biaxial extruder so as to obtain pellets. TEX30α (specification: perfect meshing, same direction rotation, double thread screw) of The Japan Steel Works, Ltd. was used as the vented biaxial extruder. The kneading zone was provided at one location in front of the vent port (upstream side). With respect to the extrusion conditions, the jetting amount was set to 30 kg/hr, the screw rotation speed was set to 150 rpm (rotations per minute), the vent vacuum was set to 3 kPa, and the extrusion temperature from a first supply port to a die portion was set to 280° C. The obtained pellets were dried at 120° C. for five hours by using a hot air circulating dryer, and then an injection molding machine (injection conditions: cylinder temperature 340° C., die temperature 80° C.) was used to produce a lens for spectacles having a thickness of 2 mm. Visual observation confirmed that the produced lens for spectacles was pale yellow transparent.

Example 15

100 parts by mass of bis-β-epithiopropyl disulfide (refractive index: 1.7) and 10 parts by mass of 4,8-dimercaptomethyl-1,11-dimercapto-3,6,9-trithiaundecane as precursors of an episulfide resin, 0.1 parts by mass of the specific compound 1-3 described above, and 0.01 parts by mass of N,N-dimethylcyclohexylamine as a polymerization catalyst were mixed using a blender so as to obtain a mixture. The obtained mixture was filled into a mold, was left at 30° C. for eight hours, and then was cured at 100° C. for 10 hours, such that a lens for spectacles having a thickness of 2 mm was produced. Visual observation confirmed that the produced lens for spectacles was transparent.

Example 16

100 parts by mass of MR-174 (registered trademark) [trade name, refractive index: 1.74, Mitsui Chemicals, Inc.] as a precursor monomer of a thiourethane resin, 0.1 parts by mass of the specific compound 1-4 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Example 17

100 parts by mass of MR-7 (registered trademark) [trade name, refractive index: 1.67, Mitsui Chemicals, Inc.] as a precursor monomer of a thiourethane resin, 0.1 parts by mass of the specific compound K-2 described above, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was transparent.

Comparative Example 1

100 parts by mass of MR-7 (registered trademark) [trade name, refractive index: 1.67, Mitsui Chemicals, Inc.] as a precursor monomer of a thiourethane resin, 0.1 parts by mass of an ultraviolet absorbing agent having the following structure as a comparative compound C-1, and 0.01 parts by mass of dibutyltin dichloride as a polymerization catalyst were mixed so as to obtain a resin composition. The obtained resin composition was filled into a mold and then was heated at 130° C. for two hours to be cured, such that a lens for spectacles having a thickness of 2 mm was produced. Visual observation confirmed that the produced lens for spectacles was orange-yellow and was inferior in transparency.

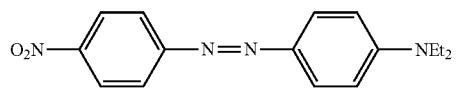

(C-1)

Comparative Example 2

100 parts by mass of MR-7 (registered trademark) [trade name, refractive index: 1.67, Mitsui Chemicals, Inc.] as a precursor monomer of a thiourethane resin, 0.1 parts by mass of an ultraviolet absorbing agent having the following structure as a comparative compound C-1, and 0.01 parts by mass of dibutyltin dichloride as a polymerization catalyst were mixed so as to obtain a resin composition. The obtained resin composition was filled into a mold (that is, a molding die) and then was heated at 130° C. for two hours to be cured, such that a lens for spectacles having a thickness of 2 mm was produced. Visual observation confirmed that the produced lens for spectacles was orange-yellow and was inferior in transparency.

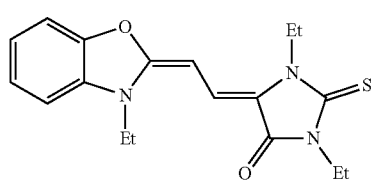

(C-2)

<Physical Properties and Performance Evaluation>

The maximum absorption wavelength and the half-width of each compound used in Examples and Comparative Examples measured in the same manner as described above are shown below.

TABLE 1

| Compound | Maximum absorption wavelength | Half-width | Remarks |
| --- | --- | --- | --- |
| I-2 | 485 nm | 30 nm | specific compound |
| I-3 | 486 nm | 30 nm | specific compound |
| I-4 | 486 nm | 31 nm | specific compound |
| I-5 | 486 nm | 31 nm | specific compound |
| I-7 | 494 nm | 30 nm | specific compound |
| H-3 | 480 nm | 32 nm | specific compound |
| H-4 | 480 nm | 31 nm | specific compound |
| J-3 | 488 nm | 30 nm | specific compound |
| J-4 | 488 nm | 30 nm | specific compound |
| J-7 | 492 nm | 32 nm | specific compound |
| K-2 | 440 nm | 32 nm | specific compound |
| C-1 | 495 nm | 85 nm | comparative compound |
| C-2 | 486 nm | 110 nm | comparative compound |

[Production of Spectacles]

Each of the lenses for spectacles of Examples 1 to 17 and Comparative Examples 1 and 2 was mounted on a spectacle frame so as to produce spectacles.

The produced spectacles or the obtained lenses for spectacles were used for evaluation according to the evaluation items.

[Evaluation]

1. Transmittance

The transmittance at the maximum absorption wavelength of each lens for spectacles of Examples and Comparative Examples was measured.

As the measuring instrument, a spectrophotometer (Model number: UV 3150) of Shimadzu Corporation was used.

The lower the measured transmittance value, the better the blue light-blocking property at the maximum absorption wavelength is. Results thereof are as shown in Table 2.

2. Haze

The haze of each lens for spectacles of Examples and Comparative examples was measured.

As the measuring instrument, a haze meter (Model number: NDH 7000) of Nippon Denshoku Industries Co., Ltd. was used.

The lower the measured haze value, the better the transparency of the lens for spectacles is. Results thereof are as shown in Table 2.

3. Light Resistance

The light resistance of each lens for spectacles of Examples and Comparative Examples was evaluated.

First, the transmittance of the lens for spectacles at the maximum absorption wavelength was measured by using a spectrophotometer (Model number: UV 3150) of Shimadzu Corporation.

Subsequently, by using a super accelerated weather fastness tester [Product name: EYE SUPER UV TESTER, Iwasaki Electric Co., Ltd.], the lens for spectacles was irradiated with the light of a metal halide lamp (cut about 290 nm or less), under the conditions of the illuminance of 90 mW/cm$^2$ (exposure energy 90 mJ/cm$^2$), a temperature of 63° C., and the relative humidity of 50%, for 60 hours. After the light irradiation, the transmittance of the lens for spectacles at the maximum absorption wavelength was measured with a spectrophotometer (model number: UV 3150) of Shimadzu Corporation in the same manner as above.

The width of the change in transmittance at the maximum absorption wavelength before and after light irradiation was calculated, and in a case where the width of change was less than 5%, the light resistance was evaluated to be "particularly satisfactory", in a case where the width of change was 5% or more and less than 10%, the light resistance was evaluated to be "satisfactory", and in a case where the width of change was 10% or more, the light resistance was evaluated to be "poor". Results thereof are as shown in Table 2.

The light resistance is an index for maintaining the satisfactory blocking property of blue light over a long period of time by suppressing the decomposition, precipitation, phase separation from the resin, etc., of the ultraviolet absorbing agent such as the specific compound contained in the lens for spectacles even in a case where the lens for spectacles is exposed to ultraviolet rays for a long period of time.

4. Yellowish Tint

Each lens for spectacles produced in Examples and Comparative Examples was placed on a white paper. One evaluation monitor was asked to visually observe the lens for spectacles on paper and evaluate whether the lens for spectacles had a yellowish tint. Results thereof are as shown in Table 2.

In this evaluation, since the lens for spectacles was placed on a white paper for evaluation, the tint of the lens for spectacles could be more clearly confirmed than the visual observation of the produced lens for spectacles described above. Therefore, the lenses for spectacles of Examples 1 to 16 that had been visually evaluated to be transparent were evaluated to be pale yellow according to the present evaluation. On the other hand, the lenses for spectacles of Comparative Examples were evaluated to be orange-yellow by both visual observation and this evaluation.

In general, in a case where the lens for spectacles has absorption on a longer wavelength side than 400 nm, since the lens for spectacles has absorption on a longer wavelength side, a change in tint of the lens for spectacles itself by visual observation and a change in tint of an object viewed through the lens for spectacles are easily recognized. Therefore, it is considered that the lenses for spectacles of Comparative Examples were evaluated to be orange-yellow not only by the evaluation of yellowish tint described above but also by visual observation for this reason. Further, regarding the change in the tint of the object viewed through the lens for spectacles, for example, in a case where the lens for spectacles is transparent to pale yellow, the change in the tint of the object is hardly recognized. On the other hand, in a case where the lens for spectacles has absorption on the longer wavelength side and has an orange to reddish tint, the change in the tint of the object is easily recognized.

5. Eye Fatigue

For each pair of spectacles using the lenses for spectacles of Examples and Comparative Examples, two evaluation monitors were asked to wear the spectacles, and evaluate whether eye fatigue was felt after three hours of continuous viewing of the display of the image display device was evaluated.

As a result, both of the two evaluation monitors wearing the spectacles comprising the lenses for spectacles of Examples 1 to 17 evaluated that eye fatigue was not felt.

On the other hand, both of the two evaluation monitors wearing with the spectacles comprising the lenses for spectacles of Comparative Examples 1 and 2 evaluated that eye fatigue was felt.

The lenses for spectacles of Examples 1 to 17 mounted on the spectacles have better blocking property of blue light having the maximum absorption wavelength than the lenses for spectacles of Comparative Examples 1 and 2, as shown in the transmittance evaluation to be described later, and thus can effectively suppress the eye fatigue caused by blue light.

6. Change in Tint

For each pair of spectacles using the lenses for spectacles of Examples and Comparative Examples, two evaluation monitors were asked to wear the spectacles, and an image displayed on the display of the image display device was viewed. Then, in a case where an image was viewed through the lens for spectacles, whether a change in the tint of the displayed image was recognized before and after wearing the spectacles was evaluated.

As a result, both of the two evaluation monitors wearing the spectacles comprising the lenses for spectacles of Examples 1 to 17 evaluated that almost no change in tint was recognized.

On the other hand, both of the two evaluation monitors wearing the spectacles comprising the lenses for spectacles of Comparative Examples 1 and 2 evaluated that a change in tint was recognized.

TABLE 2

| | Compound | Resin | Ultraviolet absorbing agent | Transmittance | Haze | Light resistance | Yellowish tint |
|---|---|---|---|---|---|---|---|
| | | | | | | Evaluation | |
| Example 1 | specific compound I-2 | urethane resin (material MR-7) | — | 0.02 | 0.2 | particularly satisfactory | pale yellow |
| Example 2 | specific compound I-3 | urethane resin (material MR-7) | — | 0.02 | 0.1 | particularly satisfactory | pale yellow |
| Example 3 | specific compound I-3 | urethane resin (material MR-7) | UV-1 | 0.02 | 0.2 | particularly satisfactory | pale yellow |
| Example 4 | specific compound I-4 | urethane resin (material MR-10) | — | 0.02 | 0.1 | particularly satisfactory | pale yellow |
| Example 5 | specific compound I-5 | urethane resin (material MR-7) | — | 0.02 | 0.2 | particularly satisfactory | pale yellow |
| Example 6 | specific compound I-7 | urethane resin (material MR-7) | — | 0.01 | 0.1 | particularly satisfactory | pale yellow |

TABLE 2-continued

|  | Compound | Resin | Ultraviolet absorbing agent | Evaluation | | | |
|---|---|---|---|---|---|---|---|
|  |  |  |  | Transmittance | Haze | Light resistance | Yellowish tint |
| Example 7 | specific compound H-3 | urethane resin (material MR-7) | — | 0.01 | 0.1 | particularly satisfactory | pale yellow |
| Example 8 | specific compound H-4 | urethane resin (material MR-7) | — | 0.03 | 0.2 | particularly satisfactory | pale yellow |
| Example 9 | specific compound J-3 | urethane resin (material MR-7) | — | 0.02 | 0.1 | particularly satisfactory | pale yellow |
| Example 10 | specific compound J-3 | urethane resin (material MR-7) | UV-1 | 0.02 | 0.2 | particularly satisfactory | pale yellow |
| Example 11 | specific compound J-4 | urethane resin (material MR-7) | — | 0.02 | 0.2 | particularly satisfactory | pale yellow |
| Example 12 | specific compound J-7 | urethane resin (material MR-7) | — | 0.02 | 0.2 | particularly satisfactory | pale yellow |
| Example 13 | specific compound I-3 | urethane resin (material MR-8) Reflective index 1.60 | — | 0.02 | 0.1 | particularly satisfactory | pale yellow |
| Example 14 | specific compound I-3 | polycarbonate resin (L-1250WP) | — | 0.03 | 0.3 | satisfactory | pale yellow |
| Example 15 | specific compound I-3 | episulfide resin | — | 0.02 | 0.2 | particularly satisfactory | pale yellow |
| Example 16 | specific compound I-4 | urethane resin (material MR-174) | — | 0.02 | 0.1 | particularly satisfactory | pale yellow |
| Example 17 | specific compound K-2 | urethane resin (material MR-7) | — | 0.02 | 0.4 | satisfactory | transparent |
| Comparative Example 1 | comparative compound C-1 | urethane resin (material MR-7) | — | 0.06 | 3.0 | poor | orange-yellow |
| Comparative Example 2 | comparative compound C-2 | urethane resin (material MR-7) | — | 0.05 | 4.0 | poor | orange-yellow |

As shown in Table 2, it was confirmed that, compared with the lenses for spectacles of Comparative Examples 1 and 2, the lenses for spectacles of Examples 1 to 17 had a low value of transmittance at the maximum absorption wavelength and had excellent blue light-blocking property.

Further, it was confirmed that, compared with the lenses for spectacles of Comparative Examples 1 and 2, the lenses for spectacles of Examples 1 to 17 had a low haze value and excellent transparency.

Furthermore, it was also confirmed that, compared with the lenses for spectacles of Comparative Examples 1 and 2, the lenses for spectacles of Examples 1 to 17 had excellent light resistance and thus hardly had a yellowish tint.

From the above results, it is understood that all of the comparative compounds used in the lenses for spectacles of Comparative Examples have a large half-width of absorption because the molecular structures thereof are easily twisted, and therefore the lenses for spectacles containing the comparative compounds tend to have a yellowish tint, and further an orange tint on the longer wavelength side. Further, it is understood that in the evaluation of light resistance, since the comparative compounds have a molecular structure which is easily twisted, the phase separation from the lens resin is promoted and the amount of light absorbed by the coloring agent is reduced by crystallization, so that the transmittance of the lens is greatly changed, and the blue light-blocking property is reduced.

On the other hand, it is understood that the specific compounds used for the lenses for spectacles of Examples have a small half-width of absorption because the specific compounds have a molecular structure which is hardly twisted, and therefore the lenses for spectacles tend to have a small yellowish tint and a pale yellow color. Furthermore, it is understood that in the evaluation of light resistance, since the specific compounds have a molecular structure which is hardly twisted, the phase separation from the lens resin is suppressed, and as a result, the change width of the transmittance is small and thus the blue light blocking property is maintained for a long period of time.

From the above evaluation results, it is expected that wearing the spectacles including the lenses for spectacles of Examples 1 to 17 suppresses the occurrence of eye fatigue and sleep disorder caused by blue light, and a change in tint of an object viewed through the spectacles is hardly recognized.

The comparison between Example 2 and Examples 13 to 15 demonstrates that the lens for spectacles of each Example achieves satisfactory performance with no practical problems regardless of the kind of resin contained therein.

The disclosure of JP2018-076258 filed on Apr. 11, 2018 is incorporated herein by reference.

All documents, patent applications, and technical standards described in the present disclosure are incorporated herein by reference to the same extent as if each individual publication or patent application was specifically and individually indicated to be incorporated by reference.

What is claimed is:

1. A lens for spectacles comprising:
   a resin; and
   a single coloring agent having both a maximum absorption wavelength in a methanol solution in a range of 480 nm to 500 nm and a half-width of an absorption peak in a methanol solution of 10 nm or more and less than 40 nm.

2. The lens for spectacles according to claim 1, wherein the single coloring agent is a methine coloring agent.

3. The lens for spectacles according to claim 1, wherein the single coloring agent is an oxonol coloring agent.

4. The lens for spectacles according to claim 3, wherein the oxonol coloring agent is represented by General Formula (1):

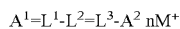

$$A^1=L^1-L^2=L^3-A^2 \ nM^+ \quad (1)$$

in General Formula (1), $A^1$ represents a keto form of an acidic nucleus selected from the group consisting of General Formulae (1-a) to (1-x); $A^2$ represents an enol form of an acidic nucleus selected from the group consisting of General Formulae (1-a) to (1-x), wherein a hydroxyl group in the enol form may be dissociated; $L^1$, $L^2$, and $L^3$ each independently represent a methine group which may be substituted; and $M^+$ represents a hydrogen atom or a monovalent counter cation, and n represents the number required to make a positive charge number of M equal to a negative charge number of $A^1=L^1-L^2=L^3-A^2$;

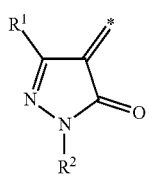
(1-a)

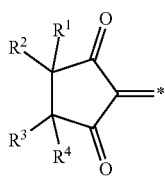
(1-b)

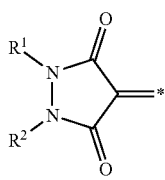
(1-c)

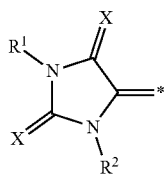
(1-d)

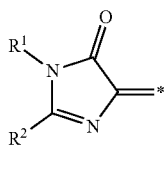
(1-e)

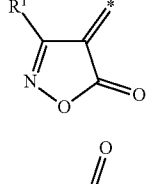
(1-f)

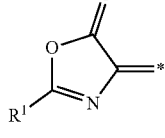
(1-g)

-continued

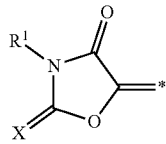
(1-h)

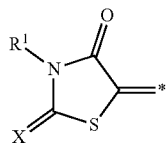
(1-i)

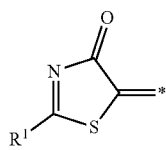
(1-j)

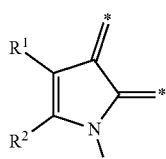
(1-k)

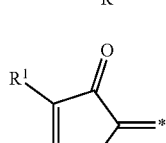
(1-l)

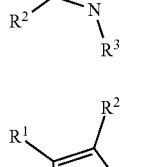
(1-m)

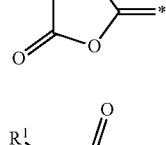
(1-n)

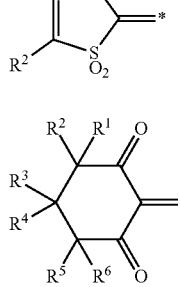
(1-o)

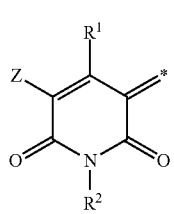
(1-p)

in General Formulae (1-a) to (1-x), each * represents a position at which the keto form A¹ of the acidic nucleus is bonded to L¹ and the enol form A² of the acidic nucleus is bonded to L³; and X represents an oxygen atom or a sulfur atom; Y represents an electron-withdrawing group; Z represents a hydrogen atom, a carbamoyl group, an alkyl group, an aryl group, a cyano group, a carboxyl group, an acyl group, an alkyloxycarbonyl group, an aryloxycarbonyl group, a halogen atom, an amino group, an acylamino group, an alkylsulfonyl group, an arylsulfonyl group, or a sulfo group; and $R^1$, $R^2$, $R^3$, $R^4$, $R^5$, and $R^6$ each independently represent a hydrogen atom or a monovalent substituent.

5. The lens for spectacles according to claim 4, wherein in General Formula (1), A¹ represents a keto form of an acidic nucleus selected from the group consisting of (1-b), (1-c), and (1-q), and A² represents an enol form of an acidic nucleus selected from the group consisting of (1-b), (1-c), and (1-q).

6. The lens for spectacles according to claim 2, wherein the methine coloring agent is represented by General Formula (2):

in General Formula (2), M⁺ represents a hydrogen atom or a monovalent counter cation.

7. The lens for spectacles according to claim 1, wherein the single coloring agent is kneaded into the resin.

8. The lens for spectacles according to claim 1, further comprising an ultraviolet absorbing agent selected from the group consisting of a benzotriazole compound and a triazine compound.

9. Spectacles comprising the lens for spectacles according to claim 1.

* * * * *